US009392206B2

(12) United States Patent
Angiolillo (10) Patent No.: US 9,392,206 B2
(45) Date of Patent: Jul. 12, 2016

(54) METHODS AND SYSTEMS FOR PROVIDING AUXILIARY VIEWING OPTIONS

(75) Inventor: Joel S. Angiolillo, Weston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1769 days.

(21) Appl. No.: 12/194,969

(22) Filed: Aug. 20, 2008

(65) Prior Publication Data

US 2010/0045866 A1    Feb. 25, 2010

(51) Int. Cl.
*H04N 5/445* (2011.01)
*H04N 21/485* (2011.01)
*H04N 21/488* (2011.01)
*H04N 21/236* (2011.01)
*H04N 21/258* (2011.01)
*H04N 21/442* (2011.01)
*H04N 21/6543* (2011.01)
*H04N 21/658* (2011.01)
*H04N 21/81* (2011.01)

(52) U.S. Cl.
CPC ..... *H04N 5/44513* (2013.01); *H04N 21/23614* (2013.01); *H04N 21/25891* (2013.01); *H04N 21/44222* (2013.01); *H04N 21/485* (2013.01); *H04N 21/4884* (2013.01); *H04N 21/6543* (2013.01); *H04N 21/6582* (2013.01); *H04N 21/8106* (2013.01)

(58) Field of Classification Search
USPC ........................................ 725/40, 46
See application file for complete search history.

(56) References Cited

U.S. PATENT DOCUMENTS

| 5,977,964 | A   | * | 11/1999 | Williams ............. G11B 27/105 |
|           |     |   |         | 348/E17.005                       |
| 2003/0033157 | A1 | * | 2/2003 | Dempski .............. H04N 5/4401 |
|           |     |   |         | 725/32                            |
| 2005/0028224 | A1 | * | 2/2005 | Liu et al. ........................ 725/136 |
| 2005/0080743 | A1 | * | 4/2005 | Ostrover ................. G06F 21/10 |
|           |     |   |         | 705/50                            |
| 2005/0120391 | A1 | * | 6/2005 | Haynie et al. .................. 725/135 |
| 2005/0204398 | A1 | * | 9/2005 | Ryal .................... G11B 27/034 |
|           |     |   |         | 725/112                           |
| 2005/0257242 | A1 | * | 11/2005 | Montgomery et al. ....... 725/116 |
| 2007/0157247 | A1 | * | 7/2007 | Cordray et al. ................. 725/47 |
| 2009/0228948 | A1 | * | 9/2009 | Guarin .................. H04N 5/278 |
|           |     |   |         | 725/137                           |

* cited by examiner

*Primary Examiner* — Michael Hong (57) ABSTRACT

A system and method may include receiving, at a set top box, one or more user request messages to display one or more auxiliary viewing options from an input device, outputting, to a display device, a plurality of auxiliary viewing options in response to receiving the one or more user request messages, receiving, at the set top box, one or more user selection messages from the input device, and outputting, to the display device, video content with one or more selected auxiliary viewing options enabled.

20 Claims, 8 Drawing Sheets

METHODS AND SYSTEMS FOR PROVIDING AUXILIARY VIEWING OPTIONS

BACKGROUND INFORMATION

Traditionally, television technologies may provide television viewers with a single auxiliary viewing option, such as, "closed captioning 1". In some cases, television viewers may be able to toggle closed captioning 1 on and off using a closed captioning (CC) button located on a television remote control device and/or a menu guide. With the advent of additional auxiliary viewing options, such as, "closed captioning 2," "closed captioning 3," "closed captioning 4," "secondary audio program 1," "secondary audio program 2," "secondary audio program 3," modifying image font size, modifying image contrast, modifying closed captioning color, modifying closed captioning font, modifying closed captioning position, etc., television technologies providing a single auxiliary viewing option may become out-dated. Since individuals with vision impairments, hearing impairments, and/or language barriers make up a significant portion of the television viewing population, television service providers may continue to search for methods and systems to provide these individuals with a plurality of auxiliary viewing options to make the television viewing experience more enjoyable.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

The description below describes elements of a system that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

The description below also describes physical and logical elements of a system, some of which are explicitly shown in figures, others that are not. The inclusion of some physical elements of a system may help illustrate how a given system may be modeled. It should be noted, however, that all illustrations are purely exemplary and that the auxiliary viewing system described herein may be performed on different varieties of systems which may include different physical and logical elements.

Figure 1:
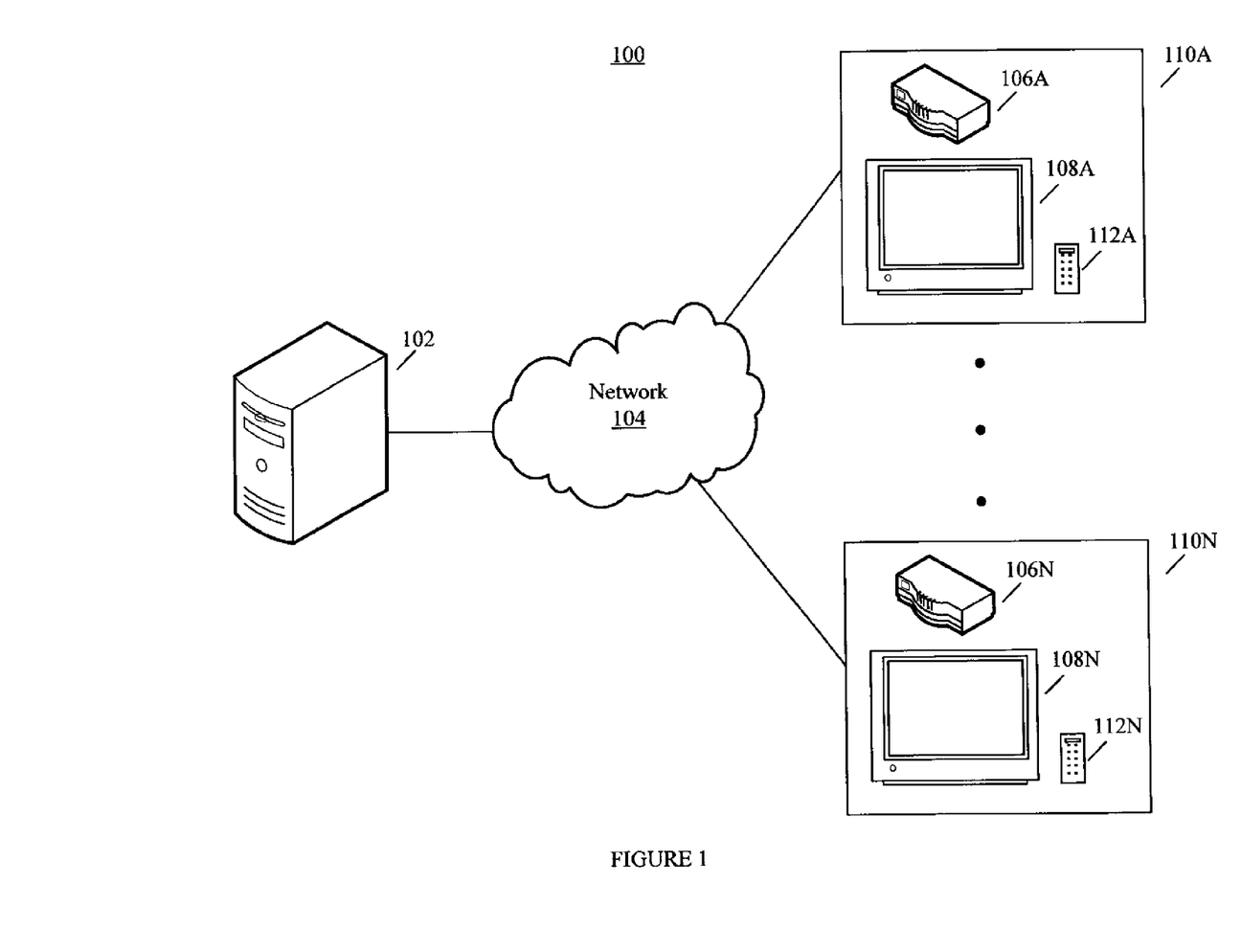
FIG. 1 illustrates a block diagram of an auxiliary viewing system in accordance with exemplary embodiments.

For instance, auxiliary viewing system 100 from FIG. 1 illustrates a simplified view of a system and various elements in the system. It is noted that other hardware and software not depicted may be included in the auxiliary viewing system 100. It is also noted that the auxiliary viewing system 100 illustrates a specific number of instances of a server 102, a network 104, a set top box 106, a display device 108, a user premise 110, and an input device 112. It will be appreciated that a single instance and/or multiple instances of these entities may be included in a system.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof.

In various embodiments, an auxiliary viewing system may enable a user to activate/deactivate, modify, and/or access one or more auxiliary viewing options while watching television content. For example, the auxiliary viewing system may enable a user to turn on/off, modify, and/or access closed captioning 1, closed captioning 2, closed captioning 3, closed captioning 4, secondary audio program 1, secondary audio program 2, secondary audio program 3, image font size, image contrast, closed captioning color, closed captioning font, and/or closed captioning position using an input device (e.g., remote control), a set top box, and/or a display device (e.g., a television monitor). It should be noted that the auxiliary viewing system may enable a user to turn on/off, modify, and/or access additional auxiliary viewing options known in the art. For example, the auxiliary viewing system may enable a user to turn on/off, modify, and/or access a plurality of alternate audio programs and/or a plurality of alternate audio tracks known in the art.

Closed captioning may include an auxiliary viewing option that displays closed captioning data in the form of captions associated with television content being viewed when activated. In various embodiments, closed captioning may provide captions and/or subtitles in various languages and/or in various forms of the languages. For example, closed captioning 1 may be associated with captions in basic English, closed captioning 2 may be associated with captions in Spanish, closed captioning 3 may be associated with captions in simplified English, and closed captioning 4 may be associated with subtitles in English. Closed captioning may include text that describes a majority of and/or all significant audio content (e.g., dialog, non-verbal sounds, scene information), while subtitling may include text that only describes dialog and/or transcribes spoken dialog. For example, non-verbal sounds may include humming, bird chirps, clapping, and/or any other sounds that may be considered non-verbal.

In various embodiments, a television program may include auxiliary viewing options and/or listening options that access secondary audio program data that can be decoded and/or played with video content. A secondary audio program may include an auxiliary viewing option that accesses secondary audio program data to play an audio track that describes visual elements associated with television content being viewed when activated. In various embodiments, secondary audio programs may provide the audio description of the visual elements associated with the television content being viewed in different languages. For example, secondary audio program 1 may be associated with audio tracks in English, secondary audio program 2 may be associated with audio tracks in Spanish, and secondary audio program 3 may be associated with audio tracks in French.

In various embodiments, an auxiliary viewing system may automatically activate/deactivate, modify, and/or access one or more auxiliary viewing options while a particular user is watching television content based on an auxiliary viewing user profile associated with the user. Accordingly, the auxiliary viewing system may monitor the user's selections associated with the auxiliary viewing options and may create an auxiliary viewing user profile that is indicative of the user's auxiliary viewing option habits. For example, an auxiliary viewing user profile may indicate that a user consistently activates the closed captioning 2 at the beginning of the "The Simpsons" television show. In another example, an auxiliary viewing user profile may indicate that a user consistently activates secondary audio program 1 from 6 pm to 9 pm in the evening. In yet another example, an auxiliary viewing user profile may indicate that a user consistently activates closed captioning 1 during television programs associated with the Spanish Channel. Thus, the auxiliary viewing system may use the auxiliary viewing user profile of a particular user to automatically activate/deactivate, modify, and/or access one or more auxiliary viewing options based on the user's auxiliary viewing user profile.

FIG. 1 illustrates an auxiliary viewing system 100 in accordance with exemplary embodiments. In various embodiments, the auxiliary viewing system 100 may provide and/or activate the display of one or more auxiliary viewing options based one or more user request messages and/or one or more user selection messages. In various embodiments, the auxiliary viewing system 100 may monitor one or more user selection messages received from a user via an input device to automatically provide and/or activate the display of one or more auxiliary viewing options based on a user profile. The auxiliary viewing system 100 may use the monitored information to create a user profile to indicate which auxiliary viewing options, and at which time, to automatically activate/deactivate the auxiliary viewing options.

In exemplary embodiments, the auxiliary viewing system 100 may include a server 102 communicatively coupled to a network 104, and one or more set top boxes 106 at one or more user premises 110 communicatively coupled to the network 104. The network 104 may communicate content signals, auxiliary viewing signals, and/or auxiliary viewing user profile message signals from the server 102 to the set top boxes 106. The server 102 may communicate the content signal, auxiliary viewing signals, and/or auxiliary viewing user profile message signals to the set top box 106 via the network 104 individually or to the set top boxes 106 as a group. In an exemplary embodiment, the server 102 may broadcast, multicast, and/or unicast the content signals, auxiliary viewing signals, and/or auxiliary viewing user profile message signals.

The content signals may be, for example, television signals and/or audio signals that may be in digital or analog form, data, requests, other digital information and/or analog information, and/or combinations thereof. The content signal may include a plurality of channels, where the set top box 106 may tune to a particular channel to display the video of the channel at a display device 108, as is well known in television systems, where the viewer may use a input device 112 (e.g., remote control, computer keyboard, computer mouse, etc.) to control which channel the set top box 106 causes display at the display device 108. The content signal may be used to display content at the display device 108. Content may be video, audio, text, or other types of visually or audibly displayable information. It is noted that the input device 112 may be integrated in either the set top box 106, the display device 108, or both.

In an exemplary embodiment, the content signal may be a cable television signal complying with the American National Standard Society of Cable Telecommunication Engineers standard ANSI/SCTE 07 2006 titled "Digital Transmission Standard for Cable Television," the contents of which are incorporated herein by reference in its entirety. The content signal may comply with other standards and may be communicated by the network 104.

The auxiliary viewing signals may include digital signals and/or analog signals associated with auxiliary viewing information. In various embodiments, the auxiliary viewing signals may be associated with specific content signals such that the content signals and associated auxiliary viewing signals are transmitted together.

The auxiliary viewing signals may be a closed captioning signals that comply with the EIA-708 closed captioning standard for ATSC digital television streams in the United States and Canada. The auxiliary viewing signals may comply with other standards and may be communicated by the network 104.

The auxiliary viewing user profile message signals may include one or more auxiliary viewing user profiles. In various embodiments, an auxiliary user profile message signal may be of the form of digital information. The auxiliary viewing user profile message signal may be communicated by the network 104.

The network 104 may be a wired network, a wireless network, and/or combinations thereof. The network 104 may transport the content signals, auxiliary viewing signals, auxiliary viewing user profile message signals, and/or various messages in analog and/or digital form from the server 102 to the set top boxes 106. The network 104 may transport analog and/or digital messages from the set top boxes 106 to the server 102. In an exemplary embodiment, at least a portion of the network 104 may comply with the Telecommunication Union Telecommunication Standard (ITU-T) Recommendation G.983.1 titled "Broadband Optical Access Systems based on Passive Optical Networks (PON)," January 2005, the contents of which are incorporated herein by reference in its entirety. The network 104 also may comply with other standards. In an exemplary embodiment, the network 104 may communicate with the set top boxes 106 using three separate wavelengths, where one of the wavelengths may exchange data using a data communication session, such as, but not limited to, Internet Protocol, another wavelength may communicate content signals, auxiliary viewing signals, and/ or auxiliary viewing user profile message signals to the set top boxes 106, and the last wavelength may receive messages from the set top boxes 106. The network 104 also may be a cable television network, a satellite network, fiber optic network, combinations thereof, or other networks capable of distributing a content signal, an auxiliary viewing signal, and/or an auxiliary viewing user profile message signal from the server 102 to the set top boxes 106, and exchanging information, messages, requests, etc., between the server 102 and the set top boxes 106 via the network 104.

The user premises 110A-N may each include a set top box 106 and a display device 108. FIG. 1 illustrates a set top box 106A and a display device 108A at user premises 110A, and a set top box 106 and a display device 108 at user premises 110N. It is also noted that a single user premises 110 may include multiple set top boxes 106 and multiple display devices 108. The set top box 106 also may be remotely located from the display device 108.

In an exemplary embodiment, the set top box 106 may be a hardware device that may receive a content signal from the network 104 and may cause display of the content signal at the display device 108. For example, the set top box 106 may cause display of a cable television signal at the display device 108, which may be, for example, a television set. The set top box 106 may be a hardware device that may receive an auxiliary viewing signal from the network 104 and may cause display of one or more auxiliary viewing options associated with the auxiliary viewing signal at the display device 108. For example, the set top box 106 may cause display of the closed captioning 1 auxiliary viewing option and the associated content at the display device 108.

The set top box 106 may be a hardware device that may receive an auxiliary viewing user profile message signal from the network 104 and may automatically cause the display of one or more auxiliary viewing options at the display device 108 based on the one or more auxiliary viewing user profiles associated with the auxiliary viewing user profile message signal. The set top box 106 may be a hardware device that may communicate messages to the network 104.

In another example, the set top box 106 may be a computer and the display device 108 may be a computer monitor. It is noted that the set top box 106 and the display device 108 are depicted and described as being separate devices in FIG. 1. The set top box 106 and the display device 108, however, may be combined into a single unit. The functions performed by the set top box 106 and the display device 108 also may implemented in a mobile phone, a wireless device, or any other device that may communicate via the network 104. The set top box 106 and the server 102 are discussed in further detail below.

Figure 2:
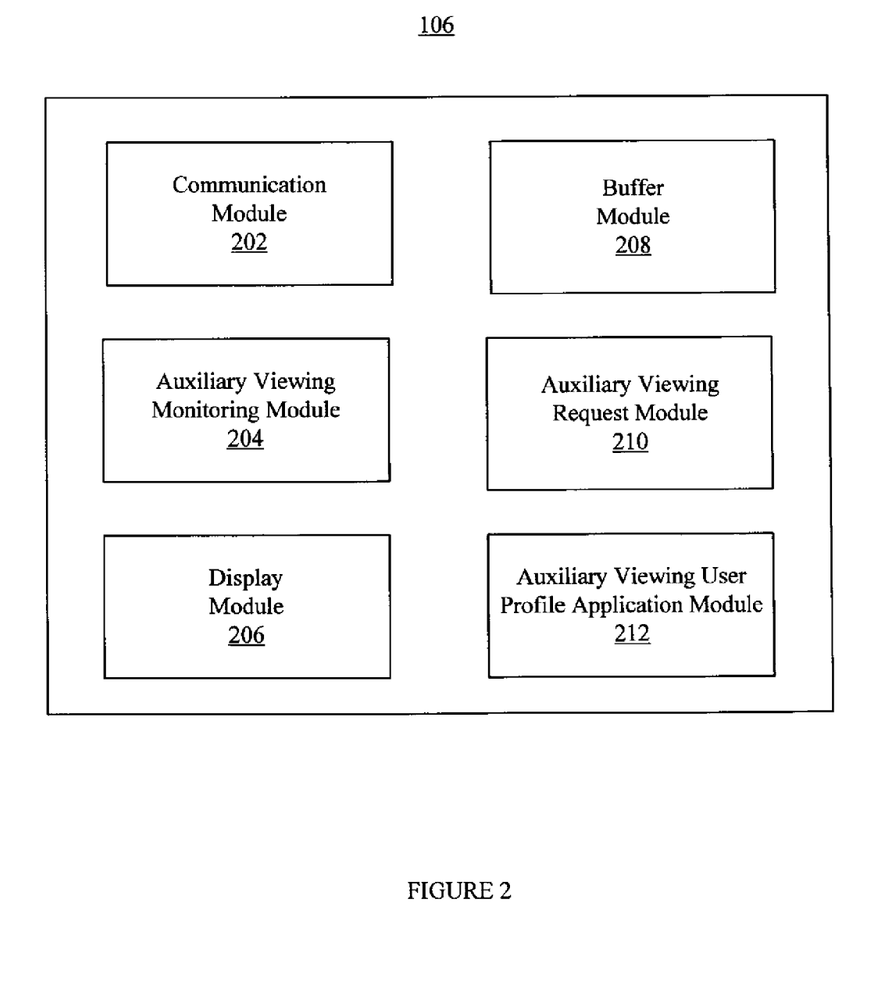
FIG. 2 illustrates exemplary modules of a set top box in accordance with exemplary embodiments.

FIG. 2 illustrates exemplary modules of a set top box 106 in accordance with exemplary embodiments. In an exemplary embodiment, the set top box 106 may include a communication module 202, an auxiliary viewing monitoring module 204, a display module 206, a buffer module 208, an auxiliary viewing request module 210, and an auxiliary viewing user profile application module 212. It is noted that the modules 202, 204, 206, 208, 210, and 212 are exemplary. The functions of the modules 202, 204, 206, 208, 210, and 212 may be performed by other modules remote or local to the set top box 106, and the modules 202, 204, 206, 208, 210, and 212 may be combined and/or separated.

The communication module 202 may provide communication between the set top box 106 and the network 104. The communication module 202 may forward the content signals, auxiliary viewing signals, auxiliary viewing user profile message signals, and/or messages received from the network 104 to the other modules 204, 206, 208, 210, and 212, and may communicate messages received from the modules 204, 206, 208, 210, and 212 to the network 104.

The auxiliary viewing monitoring module 204 may monitor which auxiliary viewing options the set top box 106 is activating, deactivating, and/or causing the display device 108 to display. Each television program may include a television program identifier that uniquely identifies a particular program from other programs. The television program identifier may be a number sequence, a letter sequence, a symbol sequence, combinations thereof, and/or other information to uniquely identify the television program. Each television channel may include a television channel identifier that uniquely identifies a particular television channel from other television channels. The television channel identifier may be a number sequence, a letter sequence, a symbol sequence, combinations thereof, and/or other information to uniquely identify the channel. Each auxiliary viewing option may include an auxiliary viewing option identifier that uniquely identifies a particular auxiliary viewing option from other auxiliary viewing options. The auxiliary viewing option identifier may be a number sequence, a letter sequence, a symbol sequence, combinations thereof and/or other information to uniquely identify the auxiliary viewing option. In various embodiments, each television program may include metadata and/or one or more meta data files. Metadata may include information associated with the television program, such as, the number and/or type of auxiliary viewing options available with the television program, one or more actors, ratings information, etc. In various embodiments, the set top box 106 may include software (e.g., IMG software) configured to access the metadata to determine which, if any, auxiliary viewing options are available for a particular television program.

When the viewer uses the input device 112 to instruct the set top box 106 to activate and/or display a particular auxiliary viewing option during a particular television program and/or on a particular television channel, the auxiliary viewing monitoring module 204 may generate auxiliary viewing monitoring data that includes the auxiliary viewing option identifier, television program identifier, and/or the television channel identifier associated with the particular auxiliary viewing option, television program, and/or television channel being activated and/or displayed. The auxiliary viewing monitoring module 204 may include in the auxiliary viewing monitoring data how long of a time interval the set top box 106 caused activation of and/or display of the particular auxiliary viewing option, television program, and/or television channel before the viewer used the user input device 112 to instruct the set top box 106 to cause activation of and/or display of a different auxiliary viewing option, television program, and/or television channel. For example, the auxiliary viewing monitoring module 204 may determine that the Closed Captioning 1 auxiliary viewing option was activated during Television Program A on Television Channel R for sixty minutes before the user deactivated Closed Captioning 1 and/or changed the television channel. The auxiliary viewing monitoring module 204 may communicate the auxiliary viewing monitoring data to the buffer module 208 for storage.

The display module 206 may control display of the content signal, the auxiliary viewing signal (e.g., auxiliary viewing options) and/or various graphical user interfaces at the display device 108. To cause display of the content signal, the display module 206 may receive instructions from the input device 112, may tune to a particular television program and/or television channel based on the received instructions, and may cause display of the particular television program and/or television channel at the display device 108. To cause display of the auxiliary viewing signal, the display module 206 may receive instructions from the input device 112, may activate a particular auxiliary viewing option based on the received instructions, and may cause display of the particular auxiliary viewing option at the display device 108. The display module 206 may cause display of an auxiliary viewing graphical user interface (GUI) and an auxiliary viewing menu options GUI at the display device 108. The auxiliary viewing GUI and the auxiliary viewing menu options GUI are discussed below in further detail.

The buffer module 208 may buffer a predefined amount of auxiliary viewing monitoring data before generating an auxiliary viewing monitoring message for communication to the server 102. The auxiliary viewing monitoring message may include the auxiliary viewing monitoring data, and optionally may include a set top box identifier that uniquely identifies the set top box 106 sending the auxiliary viewing monitoring message. The set top box identifier may be a number sequence, a letter sequence, a symbol sequence, combinations thereof, and/or other information to uniquely identify the set top box 106. The buffer module 208 may communicate the auxiliary viewing monitoring message at predefined intervals (e.g., every minute, every hour, every day), in real-time, near real-time, every time the viewer uses the input device 112 to select a different auxiliary viewing option, television program, and/or television channel, after the viewer has changed auxiliary viewing options, the television programs, and/or television channels a certain number of times, combinations thereof, and/or upon other time intervals or other events relating to changing the auxiliary viewing options, television channels, and/or viewing different television programs.

The auxiliary viewing request module 210 may generate auxiliary viewing option request messages based on user inputs provided by the viewer using the input device 112. Based on the auxiliary viewing options request messages, the display module 206 may cause display of the auxiliary viewing GUI to permit the viewer to activate the Closed Captioning 1 auxiliary viewing option or access additional auxiliary viewing options and may cause display of the auxiliary viewing menu options GUI at the display device 108 to permit the viewer to activate/deactivate, access, and/or modify an auxiliary viewing option. The viewer may use the input device 112 to generate a user selection message to request to activate/deactivate an auxiliary viewing option, access an auxiliary viewing option, and/or modify an auxiliary viewing option.

The auxiliary viewing user profile application module 212 may automatically activate/deactivate one or more auxiliary viewing options based on a auxiliary viewing user profile. For example, the auxiliary viewing user profile application module 212 may activate the closed captioning 2 at the beginning of the "The Simpsons" television show based on a particular auxiliary viewing user profile. In another example, the auxiliary viewing user profile application module 212 may activate the secondary audio program 1 from 6 pm to 9 pm in the evening based on another and/or the same auxiliary viewing user profile. In yet another example, the auxiliary viewing user profile application module 212 may activate the closed captioning 1 during television programs associated with the Spanish Channel based on yet another auxiliary viewing user profile and/or the same auxiliary viewing user profile. Thus, the auxiliary viewing user profile application module 212 may use the auxiliary viewing user profile of a particular user to automatically activate/deactivate, modify, and/or access one or more auxiliary viewing options based on the user's auxiliary viewing user profile.

Figure 3:
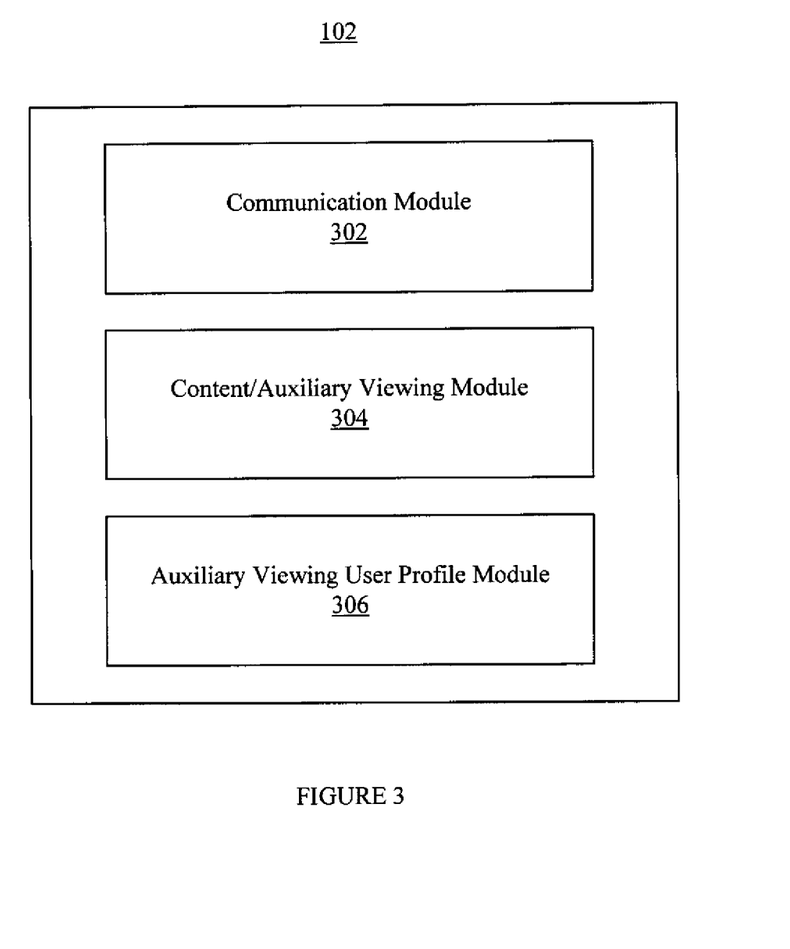
FIG. 3 illustrates various modules of a server in accordance with exemplary embodiments.

FIG. 3 illustrates various modules of the server in accordance with exemplary embodiments. In an exemplary embodiment, the server 102 may include a communication module 302, a content/auxiliary viewing module 304, and an auxiliary viewing user profile module 306. It is noted that the modules 302, 304, and 306 are exemplary. The functions of the modules 302, 304, and 306 may be performed at other modules remote or local to the server 102, and the modules 302, 304, and 306 may be combined and/or separated.

The communication module 302 may communicate content signals, auxiliary viewing signals, and/or auxiliary viewing user profile message signals from the server 102 to the network 104. The communication module 302 also may communicate messages received from the modules 304 and 306 to the network 104, and may communicate messages to the modules 304 and 306 received from the network 104.

The content/auxiliary viewing module 304 may generate the content signal and/or the auxiliary viewing signal and may communicate the content signal and/or the auxiliary viewing signal to the user premises 110. The content/auxiliary viewing module 304 may unicast the content signal and/or the auxiliary viewing signal to a single set top box 106, may multicast the content signal and/or the auxiliary viewing signal to a group of set top boxes 106, may broadcast the content signal and/or the auxiliary viewing signal to the set top boxes 106, and/or combinations thereof.

The auxiliary viewing user profile module 306 may analyze the auxiliary viewing monitoring data included in the auxiliary viewing monitoring message received from some or all of the set top boxes 106. The auxiliary viewing user profile module 306 may generate and/or create one or more auxiliary viewing user profiles based on the auxiliary viewing monitoring data. The auxiliary viewing user profile may indicate which auxiliary viewing options, and at which time, to automatically activate/deactivate the auxiliary viewing options.

In an exemplary embodiment, the auxiliary viewing user profile module 306 may consider the length of time on which a set top box 106 activates and/or causes the display of a particular auxiliary viewing option at the display device 108. The auxiliary viewing user profile module 306 may use the length of time to determine whether an auxiliary viewing option should be automatically activated by an auxiliary viewing user profile. For example, the auxiliary viewing user profile module 306 may determine that auxiliary viewing options activated for short period of times (e.g., seconds, a few minutes) will not be automatically activated and may determine that auxiliary viewing options activated for long period of times (e.g., 30 minutes, hours) will be automatically activated.

In various embodiments, the auxiliary viewing user profile module 306 may use one or more scoring systems to determined which auxiliary viewing options are automatically activated. For example, the auxiliary viewing user profile module 306 may allot points based on how long an auxiliary viewing program is activated and/or displayed. In an exemplary embodiment, the auxiliary viewing user profile module 306 may give a point for every half hour or more of activation and/or display, one half point for fifteen minutes or more, but less than a half hour, of activation and/or display, a quarter point for five minutes or more, but less than fifteen minutes, of activation and/or display. Any auxiliary viewing program activated and/or displayed for less than five (5) minutes may not be considered to remove spurious auxiliary viewing options activation. The auxiliary viewing user profile module 306 may impose that if the same auxiliary viewing option is activated and/or displayed for more than a certain amount of time (e.g., six hours), the auxiliary viewing user profile module 306 may consider the first hour and may ignore any points awarded for the other hours. This may account for the scenario where a viewer has just activated an auxiliary viewing option and gone to sleep, or left a television set on and is not watching the television program and/or television channel. In various embodiments, a scoring system may be used to determine how often and/or how long a television program is displayed before the viewer's displaying commands are recorded by the auxiliary viewing system 100. It is noted that the above embodiment for allotting points is exemplary, and other allocation systems also may be used.

After determining which auxiliary viewing options to activate and/or deactivate automatically, the auxiliary viewing user profile module 306 may create an auxiliary viewing user profile message associated with at least one auxiliary viewing user profile based on the one or more auxiliary viewing options determined to be automatically activated. The auxiliary viewing user profile message may include auxiliary viewing option identifiers, television program identifiers, television channel identifiers, and/or and an indication of time of activation for each auxiliary viewing option included. The server 102 may communicate the auxiliary viewing user profile message to the set top box 106 to cause automatic activation of and/or display of the auxiliary viewing options included in the auxiliary viewing user profile message at the display device 108 at the indicated time.

Figure 4:
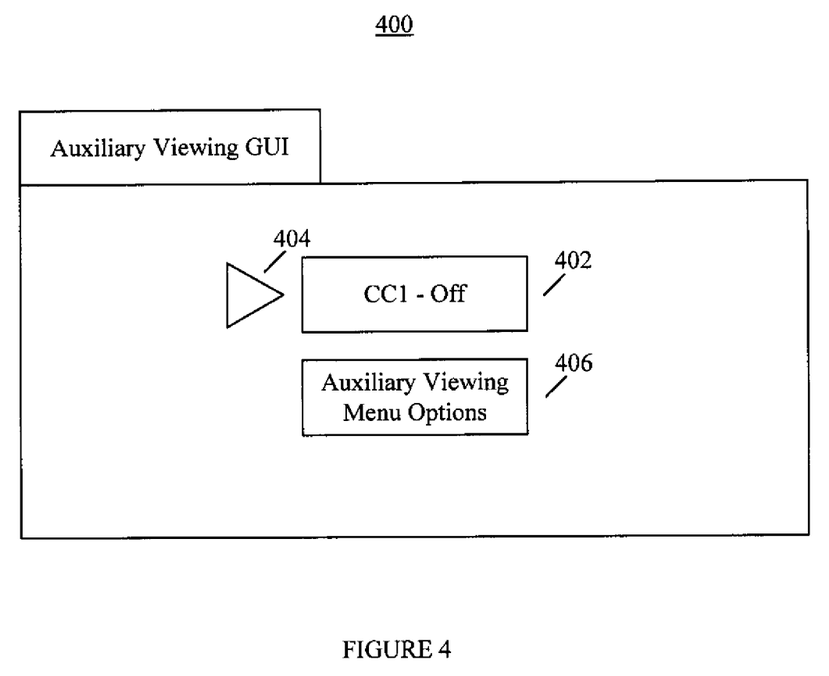
FIG. 4 illustrates an exemplary screen shot of an auxiliary viewing graphical user interface in accordance with exemplary embodiments.

FIG. 4 illustrates an exemplary screenshot of an auxiliary viewing graphical user interface 400 in accordance with exemplary embodiments. The auxiliary viewing graphical user interface 400 may permit the viewer to instruct the set top box 106 to retrieve one or more auxiliary viewing options for activation and/or display at the display device 108.

In an exemplary embodiment, the auxiliary viewing graphical user interface 400 may be displayed in response to a viewer request to view the auxiliary viewing graphical user interface 400. For example, the viewer may use the input device 112 to generate an auxiliary viewing options display request that requests the set top box 106 to cause display of the auxiliary viewing graphical user interface 400 at the display device 108. In various embodiments, the viewer may press the "CC" button associated with the input device 112 and/or access a closed captioning option in a menu guide to generate an auxiliary viewing options display request. When the auxiliary viewing options display request is received, the display module 206 of the set top box 106 may generate and/or display the auxiliary viewing graphical user interface 400.

The viewer may use the input device 112 to select one of the auxiliary viewing option fields 402, 406. In an exemplary embodiment, the auxiliary viewing graphical user interface 400 may include an indicator 404 to identify which auxiliary viewing options fields 402, 406 are selected, and the viewer may press an input key on the input device 112 to generate a select message requesting that the set top box 106 activate and/or display the selected auxiliary viewing option associated with the request field. If, for example, the viewer selects the "CC1-Off" request field 402, the display module 206 may activate the closed captioning 1 auxiliary viewing option. If, however, the viewer selects the "Auxiliary Viewing Menu Options" request field 406, the display module 206 may display the auxiliary viewing menu options GUI described in further detail in FIG. 5.

Figure 5:
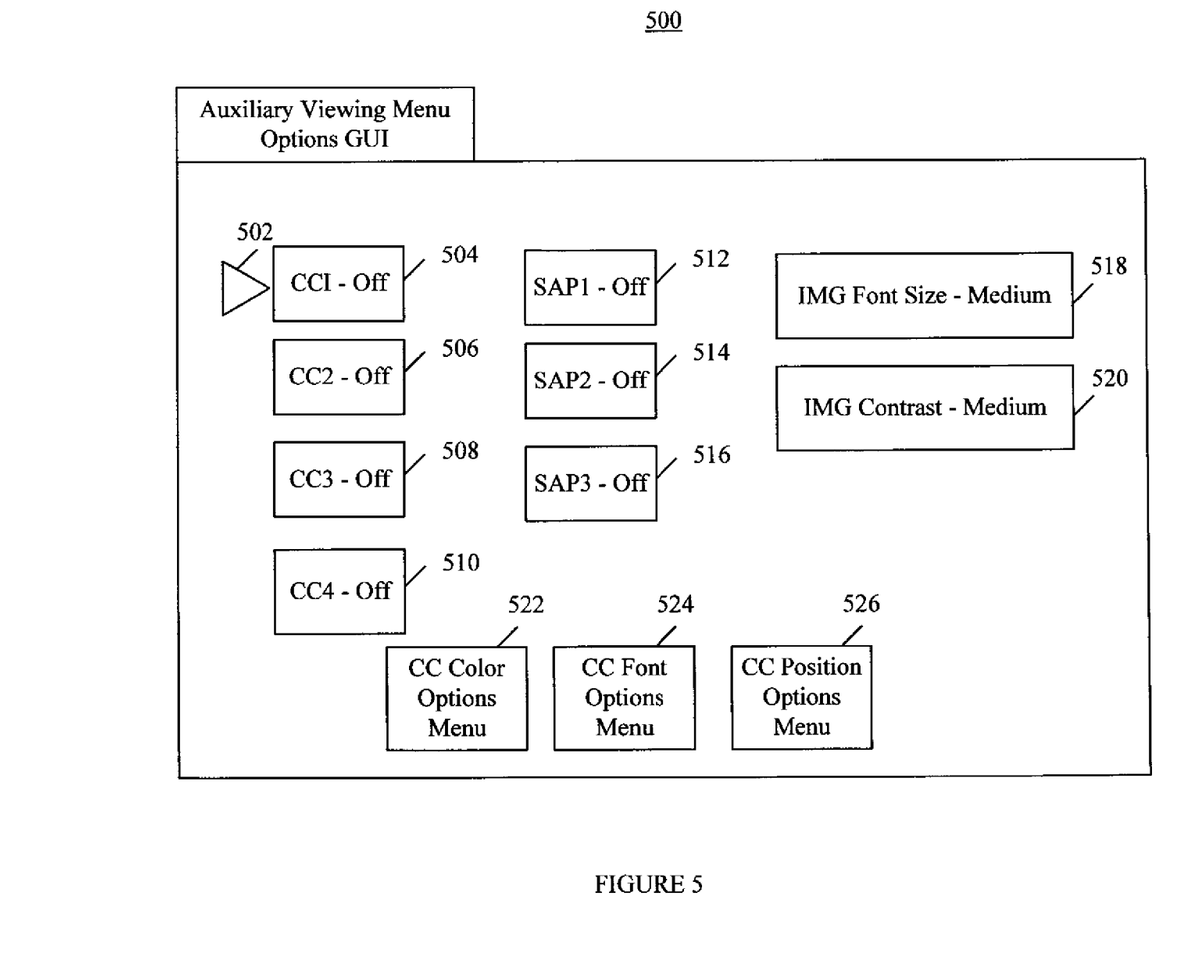
FIG. 5 illustrates an exemplary screen shot of an auxiliary viewing menu options graphical user interface in accordance with exemplary embodiments.

FIG. 5 illustrates an auxiliary viewing menu options graphical user interface 500 in accordance with exemplary embodiments. The auxiliary viewing menu options graphical user interface 500 may permit the viewer to activate/deactivate, access, and/or modify auxiliary viewing options that are not included and/or displayed in the auxiliary viewing graphical user interface 400 described in FIG. 4. In an exemplary embodiment, the auxiliary viewing menu options graphical user interface 500 may be displayed in response to a viewer request to view the auxiliary viewing menu options graphical user interface 500.

In an exemplary embodiment, the display module 206 may display the auxiliary viewing menu options graphical user interface 500 as depicted in FIG. 5. A viewer may use the input device 112 to select and/or activate the closed captioning auxiliary viewing options by moving the indicator 502 next to the desired closed captioning auxiliary viewing option. In various embodiments, the indicator 502 may be configured to initially be located next to the "CC1-Off" request field 504 as a default. For example, the viewer may select and/or activate the closed captioning 1, closed captioning 2, closed captioning 3, and/or closed captioning 4 by moving the indicator 502 next to the "CC1-Off" request field 504, "CC2-Off" request field 506, "CC3-Off" request field 508, and/or the "CC4-Off" request field 508, respectively.

A viewer may use the input device 112 to select and/or activate the secondary audio program auxiliary viewing options by moving the indicator 502 next to the desired secondary audio program auxiliary viewing option. For example, the viewer may select and/or activate the secondary audio program 1, secondary audio program 2, and/or secondary audio program 3 by moving the indicator 502 next to the "SAP1-Off" request field 512, "SAP2-Off" request field 514, and/or the "SAP3-Off" request field 516, respectively. In various embodiments, auxiliary viewing menu options graphical user interface 500 may display additional auxiliary viewing options (not shown). For example, the auxiliary viewing menu options graphical user interface 500 may enable a user to turn on/off, modify, and/or access a plurality of alternate audio programs and/or a plurality of alternate audio tracks known in the art.

A viewer may use the input device 112 to select, activate, and/or modify the image auxiliary viewing options by moving the indicator 502 next to the desired image auxiliary viewing option. For example, the viewer may select, activate, and/or modify the image font size and/or image contrast by moving the indicator 502 next to the "IMG Font Size-Medium" request field 518 and/or the "IMG Contrast-Medium" request field 520, respectively.

Finally, the viewer may access one or more closed captioning menus by moving the indicator 502 next to the desired closed captioning menu. For example, the viewer may access the closed captioning color options menu, closed captioning font options menu, and/or closed captioning position options menu by moving the indicator 502 next to the "CC Color Options Menu" request field 522, "CC Font Options Menu" request field 524, and/or the "CC Position Options Menu" request field 526, respectively. In various embodiments, auxiliary viewing options that may not be available for certain content may be grayed out in one or more graphical user interfaces.

Figure 6:
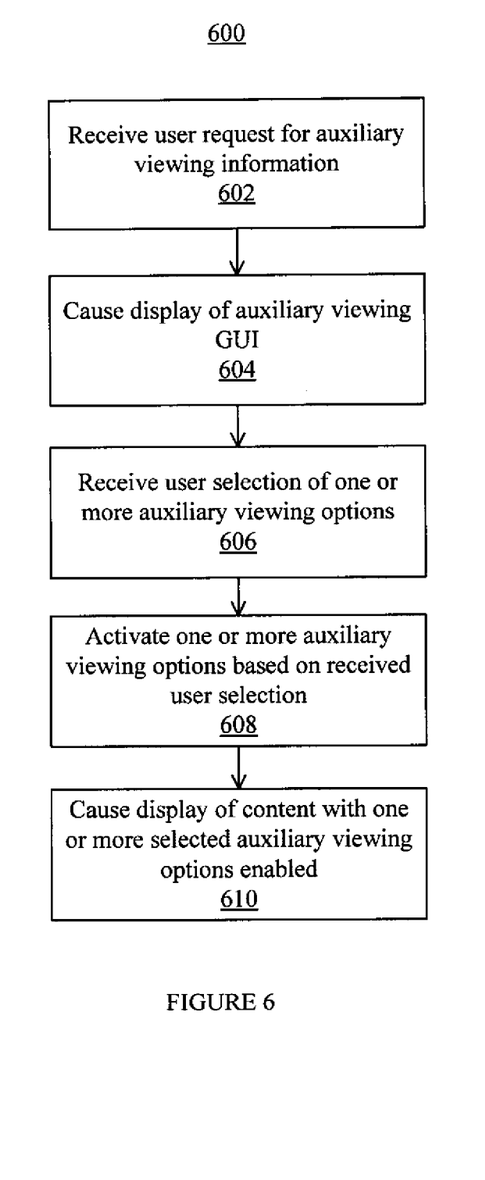
FIG. 6 illustrates a flowchart of a method for offering auxiliary viewing options in accordance with exemplary embodiments.

FIG. 6 illustrates a flowchart of a method 600 for offering auxiliary viewing options in accordance with exemplary embodiments. This exemplary method is provided by way of example, as there are a variety of ways to carry out methods disclosed herein. The method 600 shown in FIG. 6 can be executed or otherwise performed by one or a combination of various systems. The method 600 is described below as carried out by the auxiliary viewing system 100 shown in FIG. 1 by way of example, and various elements of the auxiliary viewing system 100 are referenced in explaining the example method of FIG. 6. Each block shown in FIG. 6 represents one or more processes, methods, or subroutines carried in the exemplary method 600. Referring to FIG. 6, the exemplary method 600 may begin at block 602.

In block 602, the method 600 may include receiving one or more user request messages for auxiliary viewing options information. In an exemplary embodiment, the auxiliary viewing request module 210 may receive the one or more user request messages from the viewer using an input device 112. In various embodiments, the one or more user request messages may be received from the viewer pressing a "CC" button associated with input device 112. The method 600 may continue to block 604.

In block 604, the method 600 may include causing the display of one or more auxiliary viewing options in an auxiliary viewing graphical user interface. In an exemplary embodiment, the display module 206 may cause the display of one or more auxiliary viewing options in response to receiving the one or more user request messages for auxiliary viewing options information. The method 600 may continue to block 606.

In block 606, the method 600 may include receiving a user selection of one or more auxiliary viewing options to be activated and/or displayed (e.g., enabled). In an exemplary embodiment, the auxiliary viewing request module 210 may receive the user selection of the one or more auxiliary viewing options to be activated and/or displayed. The method 600 may continue to block 608.

In block 608, the method 600 may include activating and/or displaying the one or more auxiliary viewing options selected in block 606. In an exemplary embodiment, the auxiliary viewing system 100 may activate the one or more auxiliary viewing options selected in block 606 by allowing the auxiliary viewing data to be displayed and/or accessed via the display module 206. The method 600 may continue to block 610.

In block 610, the method 600 may include causing the display of content with the one or more selected auxiliary viewing options activated and/or displayed (e.g., enabled). In an exemplary embodiment, the display module 206 may cause display of content with the one or more selected auxiliary viewing options activated and/or displayed at the display device 108. The method 600 may then end.

Figure 7:
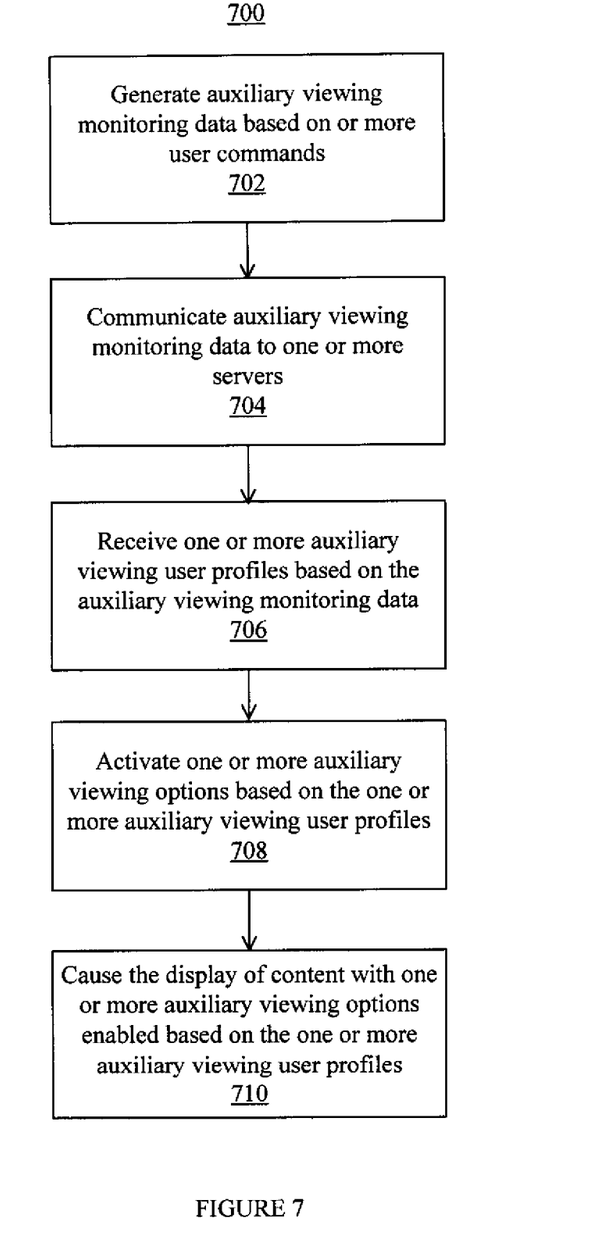
FIG. 7 illustrates a flowchart of another method for offering auxiliary viewing options in accordance with exemplary embodiments.

FIG. 7 illustrates a flowchart of another method 700 for offering auxiliary viewing options in accordance with exemplary embodiments. This exemplary method is provided by way of example, as there are a variety of ways to carry out methods disclosed herein. The method 700 shown in FIG. 7 can be executed or otherwise performed by one or a combination of various systems. The method 700 is described below as carried out by the auxiliary viewing system 100 shown in FIG. 1 by way of example, and various elements of the auxiliary viewing system 100 are referenced in explaining the example method of FIG. 7. Each block shown in FIG. 7 represents one or more processes, methods, or subroutines carried in the exemplary method 700. Referring to FIG. 7, the exemplary method 700 may begin at block 702.

In block 702, the method 700 may include generating auxiliary viewing monitoring data at a set top box 106. In an exemplary embodiment, when the viewer uses the input device 112 to instruct the set top box 106 to activate and/or display a particular auxiliary viewing option during a particular television program and/or on a particular television channel, the auxiliary viewing monitoring module 204 may generate auxiliary viewing monitoring data that includes the auxiliary viewing option identifier, television program identifier, and/or the television channel identifier associated with the particular auxiliary viewing option, television program, and/or television channel being activated and/or displayed. The method 700 may continue to block 704.

In block 704, the method 700 may include communicating the auxiliary viewing monitoring data to the server 102 via network 104. In an exemplary embodiment, the communication module 202 may communicate the auxiliary viewing monitoring data to the server 102 in the form of an auxiliary viewing monitoring message. The method 700 may continue to block 706.

In block 706, the method 700 may include receiving one or more auxiliary viewing user profiles based on the auxiliary viewing monitoring data. In an exemplary embodiment, the set top box 106 may receive one or more auxiliary viewing user profiles based on the auxiliary viewing monitoring data from a server 102 in an auxiliary viewing user profile message via the network 104. In various embodiments, one or more auxiliary viewing user profiles may be created, generated, and/or stored at the set top box 106. The method 700 may continue to block 708.

In block 708, the method 700 may include automatically activating one or more auxiliary viewing options based on the one or more auxiliary viewing user profiles. In an exemplary embodiment, the auxiliary viewing user profile application module 212 may automatically activate one or more auxiliary viewing options based on the one or more auxiliary viewing user profiles received from the server 102. The method 700 may continue to block 710.

In block 710, the method 700 may include causing the display of content with one or more auxiliary viewing options activated and/or displayed (e.g., enabled). In an exemplary embodiment, the display module 206 may cause display of content with one or more auxiliary viewing options activated and/or displayed at the display device 108. The method 700 may then end.

Figure 8:
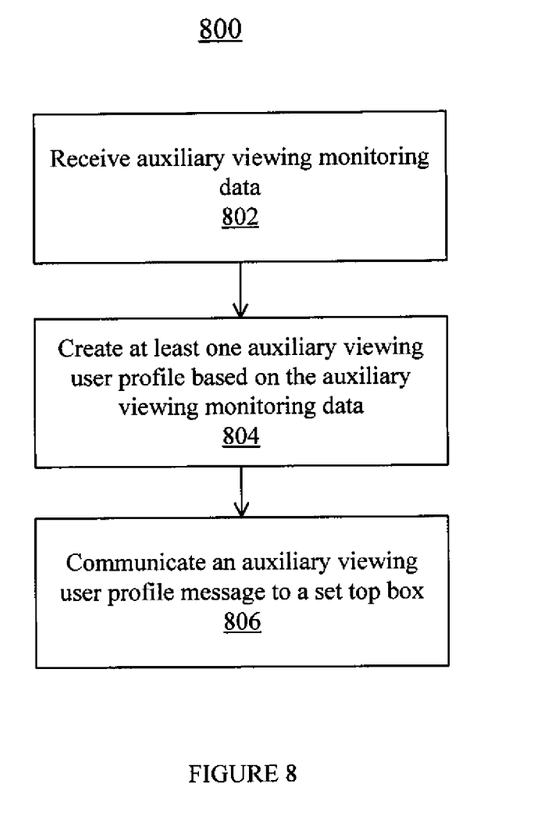
FIG. 8 illustrates a flowchart of a method for providing one or more auxiliary viewing user profiles to a set top box in accordance with exemplary embodiments.

FIG. 8 illustrates a flowchart of a method 800 for providing one or more auxiliary viewing user profiles to a set top box in accordance with exemplary embodiments. This exemplary method is provided by way of example, as there are a variety of ways to carry out methods disclosed herein. The method 800 shown in FIG. 8 can be executed or otherwise performed by one or a combination of various systems. The method 800 is described below as carried out by the auxiliary viewing system 100 shown in FIG. 1 by way of example, and various elements of the auxiliary viewing system 100 are referenced in explaining the example method of FIG. 8. Each block shown in FIG. 8 represents one or more processes, methods, or subroutines carried in the exemplary method 800. Referring to FIG. 8, the exemplary method 800 may begin at block 802.

In block 802, the method 800 may include receiving an auxiliary viewing monitoring message from one or more set top boxes. In an exemplary embodiment, the auxiliary viewing user profile module 306 of the server 102 may receive the auxiliary viewing monitoring data from some or all of the set top boxes 106A to 106N. The method 800 may continue to block 804.

In block 804, the method 800 may include generating, creating, and/or updating one or more auxiliary viewing user profiles based on the auxiliary viewing monitoring messages. In an exemplary embodiment, the auxiliary viewing user profile module 306 may analyze the auxiliary viewing monitoring data to generate and/or create one or more auxiliary viewing user profiles. The method 800 may continue to block 806.

In block 806, the method 800 may include communicating an auxiliary viewing user profile message to the set top boxes. In an exemplary embodiment, the auxiliary viewing user profile module 306 may generate an auxiliary viewing user profile message for communication to one or more of the set top boxes 106A-N. The auxiliary viewing user profile message may include auxiliary viewing option identifiers, television program identifiers, television channel identifiers, and/or and an indication of time of activation for each auxiliary viewing option included. The method 800 may then end.

It should be noted that automatically providing auxiliary viewing options for various users within a household may be achieved dynamically. In various embodiments, each user of the household may have a separate login identification and/or password for the set top box 106. In this example, each user of the household may be associated with a separate auxiliary viewing user profile in the auxiliary viewing system 100. Once the set top box 106 receives login information and/or a password associated with a particular user, the set top box 106 may also store the auxiliary viewing monitoring data associated with the user separate from other auxiliary viewing monitoring data associated with other users. This may be particularly useful in households with many residents. In another embodiment, login identifications and/or passwords may not be necessary. For example, each user of a household may be identified by the auxiliary viewing system 100, via a login, an on-screen option, finger recognition associated with the input device 112, speech recognition, and/or any other technology that may be used to identify a user from one or more other users.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
  receiving, at a set top box, one or more user request messages to display one or more auxiliary viewing options from an input device;
  outputting, to a display device, a plurality of available auxiliary viewing options in response to receiving the one or more user request messages;
  receiving, at the set top box, one or more user selection messages from the input device, wherein each user selection message includes a selected auxiliary viewing option;
  outputting, to the display device, video content with one or more selected auxiliary viewing options enabled, wherein the video content is communicated to the set top box including metadata comprising an indication of one or more auxiliary viewing options available to be activated for the video content;
  generating, at the set top box, auxiliary viewing monitoring data based on the one or more user selection messages, wherein the auxiliary viewing monitoring data comprises the available auxiliary viewing options and an auxiliary viewing option identifier associated with the selected auxiliary viewing option, a display time interval associated with an auxiliary viewing option previously enabled at the set top box, and a channel identifier;
  determining whether the one or more auxiliary viewing options indicated in the metadata corresponds to at least a portion of the auxiliary viewing monitoring data, wherein the portion of the auxiliary viewing monitoring data comprises the display time interval associated with the auxiliary view option previously enabled at the set top box; and
  based on the determination, automatically activating one or more corresponding auxiliary viewing options associated with the auxiliary viewing monitoring data that are also available to be activated for the video content.

2. The method of claim 1, wherein the plurality of auxiliary viewing options includes at least one of closed captioning 1, closed captioning 2, closed captioning 3, closed captioning 4, secondary audio program 1, secondary audio program 2, secondary audio program 3, image font size, image contrast, closed captioning color, closed captioning font, and closed captioning position.

3. The method of claim 1, wherein receiving, at the set top box, one or more user selection messages further comprises receiving one or more user selection messages comprising a selection of one or more auxiliary viewing options to be enabled.

4. The method of claim 1, further comprising activating one or more auxiliary viewing options based on the one or more user selection messages.

5. A non-transitory computer readable media comprising code to perform the acts of the method of claim 1.

6. The method of claim 1, wherein the one or more activated auxiliary viewing options is further based on an auxiliary viewing score, wherein the auxiliary viewing score is based on at least one of: a length of activation and a frequency of activation.

7. The method of claim 1, wherein the one or more selection messages comprises at least a first selection message including a primary selected auxiliary viewing option and a second selection message including a secondary selected auxiliary viewing option.

8. A method comprising:
  monitoring auxiliary viewing options being activated at a set top box to generate auxiliary viewing monitoring data;
  communicating the auxiliary viewing monitoring data to a server via a network, the server creating one or more auxiliary viewing user profiles based on the auxiliary viewing monitoring data, wherein the auxiliary viewing monitoring data comprises available auxiliary viewing options, an auxiliary viewing option identifier and a display time interval associated with an auxiliary viewing option previously activated at the set top box;
  receiving, at the set top box, the one or more auxiliary viewing user profiles from the server;
  receiving, at the set top box, video content, wherein the video content is communicated to the set top box including metadata comprising an indication of one or more auxiliary viewing options available to be activated for the video content;
  determining whether the one or more auxiliary viewing options indicated in the metadata corresponds to at least a portion of the one or more auxiliary viewing user profiles, wherein the portion of the one or more auxiliary viewing user profiles comprises the display time interval associated with the auxiliary view option previously activated at the set top box; and
  based on the determination, automatically activating one or more corresponding auxiliary viewing options associated with the one or more auxiliary viewing user profiles that are also available to be activated for the video content.

9. The method of claim 8, wherein auxiliary viewing options includes at least one of closed captioning 1, closed captioning 2, closed captioning 3, closed captioning 4, secondary audio program 1, secondary audio program 2, secondary audio program 3, image font size, image contrast, closed captioning color, closed captioning font, and closed captioning position.

10. The method of claim 8, wherein monitoring auxiliary viewing options being activated further comprises monitoring the receipt of one or more user selection messages from an input device.

11. The method of claim 8, further comprising outputting, to a display device, video content based on the activated one or more corresponding auxiliary viewing options.

12. A non-transitory computer readable media comprising code to perform the acts of the method of claim 8.

13. The method of claim 10, wherein the one or more user selection messages comprises a selection of one or more available auxiliary viewing options to be enabled.

14. A system comprising:
one or more computer processors; and
memory having instructions stored thereon, the instructions, when executed by the one or more processors, cause the one or more computer processors to:
receive one or more user requests to display one or more auxiliary viewing options from an input device;
output a plurality of available auxiliary viewing options in response to receiving the one or more user request messages;
request module to receive one or more user selection messages from the input device;
output video content with one or more selected auxiliary viewing options enabled, wherein the video content is communicated to the one or more computer processors including metadata comprising an indication of one or more auxiliary viewing options available to be activated for the video content;
generate auxiliary viewing monitoring data based on the one or more user selection messages, wherein the auxiliary viewing monitoring data comprises the available auxiliary viewing options, an auxiliary viewing option identifier and a display time interval associated with an auxiliary viewing option previously enabled;
determine whether the one or more auxiliary viewing options indicated in the metadata corresponds to at least a portion of the auxiliary viewing monitoring data, wherein the portion of the one or more auxiliary viewing monitoring data comprises the display time interval associated with the auxiliary view option previously enabled; and
automatically activate, based on the determination, one or more corresponding auxiliary viewing options associated with the generated auxiliary viewing monitoring data that are also available to be activated for the video content.

15. The system of claim 14, wherein the plurality of auxiliary viewing options includes at least one of closed captioning 1, closed captioning 2, closed captioning 3, closed captioning 4, secondary audio program 1, secondary audio program 2, secondary audio program 3, image font size, image contrast, closed captioning color, closed captioning font, and closed captioning position.

16. A system comprising:
one or more computer processors; and
memory having instructions stored thereon, the instructions, when executed by the one or more processors, cause the one or more computer processors to:
monitor auxiliary viewing options being activated at a set top box to generate auxiliary viewing monitoring data;
communicate the auxiliary viewing monitoring data to a server via a network, wherein the server creates one or more auxiliary viewing user profiles using the auxiliary viewing monitoring data, wherein the auxiliary viewing monitoring data comprises available auxiliary viewing options, an auxiliary viewing option identifier and a display time interval associated with an auxiliary viewing option previously activated at the set top box;
receive video content, wherein the video content is communicated to the one or more computer processors including metadata comprising an indication of one or more auxiliary viewing options available to be activated for the video content;
determine whether the one or more auxiliary viewing options indicated in the metadata corresponds to at least a portion of the one or more auxiliary viewing user profiles, wherein the portion of the one or more auxiliary viewing user profiles comprises the display time interval associated with the auxiliary view option previously activated at the set top box; and
automatically activate, based on the determination, one or more auxiliary viewing options associated with the auxiliary viewing user profiles that are also available to be activated for the video content.

17. The system of claim 16, wherein auxiliary viewing options includes at least one of closed captioning 1, closed captioning 2, closed captioning 3, closed captioning 4, secondary audio program 1, secondary audio program 2, secondary audio program 3, image font size, image contrast, closed captioning color, closed captioning font, and closed captioning position.

18. The system of claim 16, wherein the one or more computer processors are further caused to monitor the receipt of one or more user selection messages from an input device.

19. The method of claim 16, wherein the one or more computer processors are further caused to output video content with one or more auxiliary viewing options enabled based on the one or more auxiliary viewing user profiles.

20. The system of claim 18, wherein the one or more user selection messages comprises a selection of one or more available auxiliary viewing options to be enabled.

* * * * *